(12) United States Patent
Ohayon et al.

(10) Patent No.: US 12,518,329 B1
(45) Date of Patent: Jan. 6, 2026

(54) SYSTEM, METHOD, AND COMPUTER PROGRAM FOR SELECTIVELY AMENDING A LARGE CUSTOMER AGREEMENT

(71) Applicant: Amdocs Development Limited, Limassol (CY)

(72) Inventors: Jean-Marc Eric Ohayon, Givat Shmuel (IL); Aliza Farjun, Hod Hasharon (IL); Hila Pinker, Yakir (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 682 days.

(21) Appl. No.: 17/523,693

(22) Filed: Nov. 10, 2021

(51) Int. Cl.
*G06Q 50/18* (2012.01)
*G06Q 30/016* (2023.01)

(52) U.S. Cl.
CPC ........... *G06Q 50/18* (2013.01); *G06Q 30/016* (2013.01)

(58) Field of Classification Search
CPC ........ G06Q 30/06; G06Q 50/18; G06Q 10/00; G06Q 10/20
See application file for complete search history.

(56) References Cited

U.S. PATENT DOCUMENTS

| | | | | |
|---|---|---|---|---|
| 5,999,949 A * | 12/1999 | Crandall | ............. | H03M 7/3088 341/51 |
| 6,427,132 B1 * | 7/2002 | Bowman-Amuah | .. | G06Q 30/02 703/22 |
| 8,285,642 B2 | 10/2012 | Cesarini et al. | | |
| 9,898,203 B2 * | 2/2018 | Shaw | .................. | G06F 12/0253 |
| 11,861,524 B1 * | 1/2024 | Li | ......................... | G06Q 10/103 |
| 2002/0116282 A1 * | 8/2002 | Martin | ................. | G06Q 20/202 705/37 |
| 2003/0187756 A1 * | 10/2003 | Klivington | ............. | G06Q 50/16 715/224 |
| 2004/0261025 A1 * | 12/2004 | Rizk | ....................... | G06F 16/93 715/255 |
| 2006/0080181 A1 | 4/2006 | Fernandes et al. | | |
| 2009/0094112 A1 * | 4/2009 | Cesarini | ................ | H04L 41/344 705/14.36 |
| 2011/0015956 A1 | 1/2011 | Curd et al. | | |
| 2011/0119571 A1 * | 5/2011 | Decker | ................ | G06F 16/9577 715/205 |
| 2017/0287090 A1 * | 10/2017 | Hunn | ........................ | H04L 63/12 |
| 2018/0173378 A1 * | 6/2018 | Tinari | .................... | G06F 40/197 |
| 2018/0220276 A1 * | 8/2018 | Senarath | ............ | H04M 15/8016 |
| 2020/0117723 A1 * | 4/2020 | Shao | ....................... | G06N 5/025 |

(Continued)

OTHER PUBLICATIONS

M. Godlewska, "Completeness and consistency of distributed electronic documents," 2008 Conference on Human System Interactions, Krakow, Poland, 2008, pp. 884-887, doi: 10.1109/HSI.2008.4581560. (Year: 2008).*

*Primary Examiner* — Maria C Santos-Diaz

(74) *Attorney, Agent, or Firm* — Zilka-Kotab, P.C.

(57) ABSTRACT

As described herein, a system, method, and computer program are provided for selectively amending a large customer agreement. A written contract for a customer representing an agreement to provision a plurality of telecommunication services at a plurality of sites of the customer is accessed. A user interface is provided presenting, as a plurality of selectable elements, a plurality of items in the written contract. An update to the written contract is received via the user interface. The update is processed as a selective amendment to the written contract to form an amended version of the written contract.

13 Claims, 16 Drawing Sheets

(56) References Cited

U.S. PATENT DOCUMENTS

| | | | |
|---|---|---|---|
| 2021/0124722 A1 | 4/2021 | Srivastava | |
| 2021/0243104 A1* | 8/2021 | Parmer | H04L 41/0869 |
| 2021/0256635 A1* | 8/2021 | Cali | G06Q 20/405 |
| 2021/0286936 A1* | 9/2021 | Choudhari | G06F 40/154 |
| 2022/0027984 A1* | 1/2022 | Charton | G06N 20/20 |
| 2022/0138161 A1* | 5/2022 | Anjum | G06F 40/197 |
| | | | 715/272 |
| 2022/0180461 A1* | 6/2022 | Bertin | G06Q 50/18 |
| 2022/0335553 A1* | 10/2022 | Chew | G06F 16/35 |

* cited by examiner

AMEND AGREEMENT

Which kind of amendment would you like to perform?

○ Full Amendment

● Selective Amendment

Cancel

Amend Agreement

SYSTEM, METHOD, AND COMPUTER PROGRAM FOR SELECTIVELY AMENDING A LARGE CUSTOMER AGREEMENT

FIELD OF THE INVENTION

The present invention relates to generating written agreements.

BACKGROUND

Today, telecommunication companies might sell thousands of services to an enterprise customer having thousands of different locations and it results in a huge contract agreement covering many customer sites and services. Usually, the customer needs to amend the contract agreement (e.g. adding a new service to a site, adding a new site, upgrading a current service such as upgrading the bandwidth, etc.). However, amending a large contract agreement is a very complex process since the person amending the contract must 1) perform a search of all the previous amendments and agreements with the customer to determine the actual services (and configurations) and sites of the customer, 2) create an amendment for a specific site based on the latest services and configurations, and 3) make sure that the new changes are recoded properly for potential future amendments. Existing solutions used for generating large customer agreements do not provide support for streamlining this amendment process.

There is thus a need for addressing these and/or other issues associated with the prior art.

SUMMARY

As described herein, a system, method, and computer program are provided for selectively amending a large customer agreement. A written contract for a customer representing an agreement to provision a plurality of telecommunication services at a plurality of sites of the customer is accessed. A user interface is provided presenting, as a plurality of selectable elements, a plurality of items in the written contract. An update to the written contract is received via the user interface. The update is processed as a selective amendment to the written contract to form an amended version of the written contract.

BRIEF DESCRIPTION OF THE DRAWINGS

FIGS. 3A-C illustrate user interfaces for initiating a selective amendment for a written contract, in accordance with one embodiment.

FIG. 4 illustrates a user interface for browsing eligible offers in association with creating a selective amendment, in accordance with one embodiment.

FIGS. 7A-F illustrate user interfaces for selecting sites and groups from a written contract for making a selective amendment, in accordance with one embodiment.

DETAILED DESCRIPTION

Figure 1:
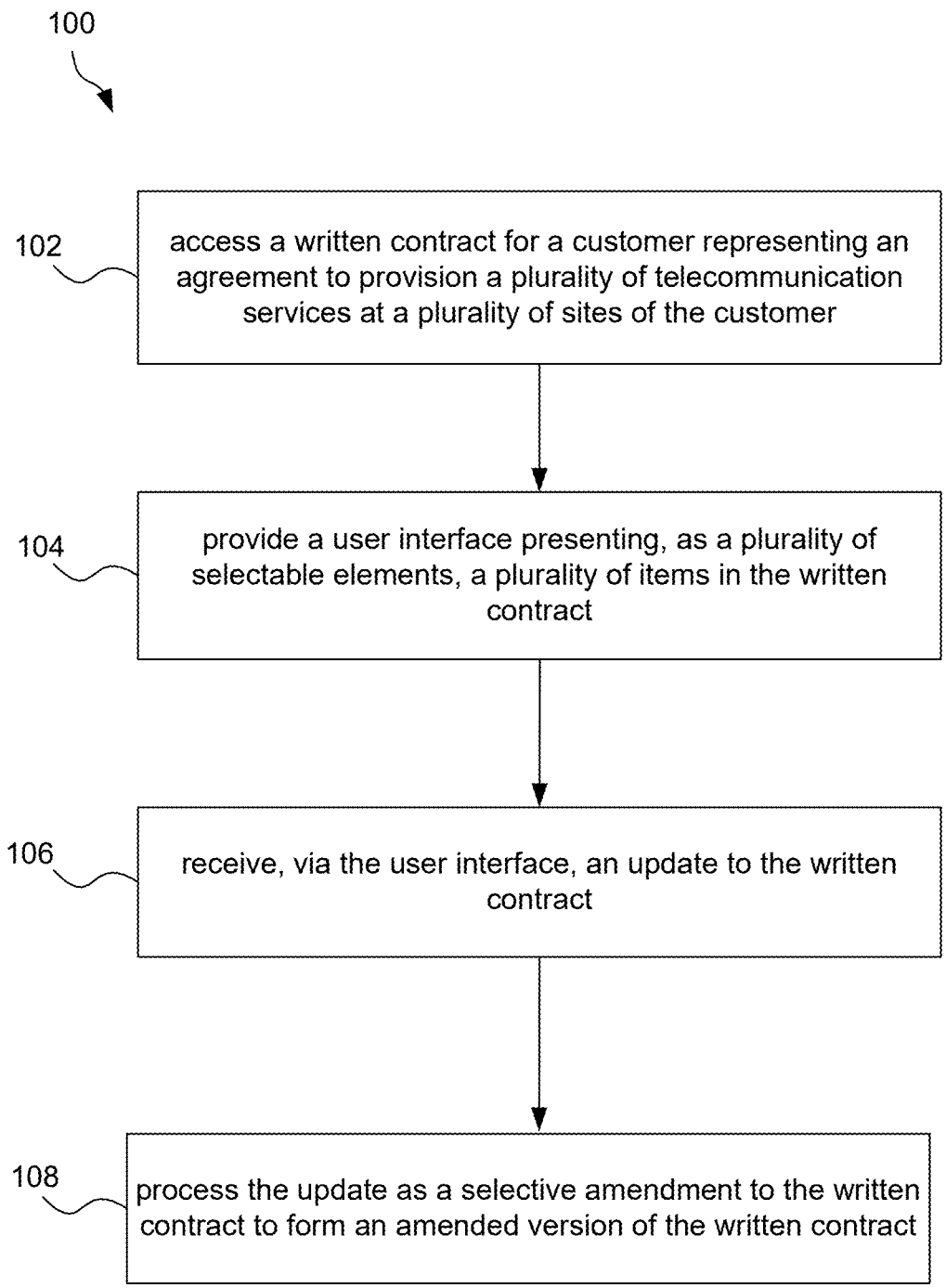
FIG. 1 illustrates a method for processing an update to a written contract as a selective amendment to the written contract, in accordance with one embodiment.

FIG. 1 illustrates a method 100 for processing an update to a written contract as a selective amendment to the written contract, in accordance with one embodiment. The method 100 may be performed by any computer system described below with respect to FIGS. 10 and/or 11. For example, the method 100 may be performed by a computer system of a telecommunication service provider used for creating an amending written contract with customers.

In operation 102, a written contract for a customer representing an agreement to provision a plurality of telecommunication services at a plurality of sites of the customer is accessed. In the context of the present description, the written contract is an electronic document, group of documents, or other data defining the agreement to provision the telecommunication services at the sites of the customer. The written contract may therefore represent an agreement between the customer and a telecommunication services provider, and may include agreed upon rates (i.e. prices) for the provisioning of the telecommunication services at the sites of the customer.

In one embodiment, the written contract may be created by applying predefined rates (i.e. offer specific rates predefined for the customer) to a customer proposal. In another embodiment, the written contract may be created based on customer acceptance of predefined offers provided by the telecommunication services provider. To this end, the written contract may specify offers, sites, and groups (of sites).

In operation 104, a user interface is provided presenting, as a plurality of selectable elements, a plurality of items in the written contract. These items may refer to the offers, sites, and groups, as mentioned above. In one embodiment, the items may be limited to items that are determined to be eligible for an update.

In one optional embodiment, as a prerequisite to providing the user interface, it may be verified that 1) a configure parameter is defined for the written contract, the configure parameter having a condition by which selective amendments to the written contract are allowed, and 2) that the condition is satisfied. For example, the condition may indicate a minimum number of offer instances that must already be included in the written contract. Thus, the selective amendment may only be allowed to be made when a number of offer instances included in the written contract is more than the minimum number.

In a further embodiment, various elements may be copied for use in creating the selective amendment (e.g. responsive to verifying that the condition is satisfied). For example, item templates that are defined as eligible for selective amendments may be copied as well as global templates and their global offers instances. The item templates may include offer templates, site templates, and group templates. Further, the item templates may be used to present the plurality of selectable elements.

In operation 106, an update to the written contract is received via the user interface. The update may be received in association with a selection (by a user) of one or more of the selectable elements. To this end, the update may include one of a plurality of predefined types of updates to be performed on one or more of a plurality of eligible items. The predefined types of updates may be supported through various user interfaces.

In one embodiment, the update may include adding a new standalone site. In another embodiment, the update may include associating a new template to a site. In yet another embodiment, the update may include adding, removing, or changing an offer instance. In a further embodiment, the update may include adding a site to a new or existing group. In still yet another embodiment, the update may include removing a site from a group. In even yet another embodiment, the update may include associating a template to a new group. Moreover, in another embodiment, the update may include cancelling removal of an instance.

In operation 108, the update is processed as a selective amendment to the written contract to form an amended version of the written contract. In one embodiment, the selective amendment may be created by applying the predefined rates (i.e. offer specific rates predefined for the customer) to the update.

A selective amendment refers to an amendment made to only a portion (subpart) of the written contract. The amendment may only be made upon acceptance by the other party to the written contract (i.e. the party receiving the selective amendment as a proposal). The update may be merged to the written contract, such that only the relevant (selective) portion of the written contract is amended to form the amended version of the written contract. To this end, a subsequent update may then be performed on the amended version of the written contract.

By providing a solution involving selective amendments, not all of the agreement items may be required to be duplicated into the selective amendment, and not all of the amendment items may need to be checked for merge and merged to the base agreement. This reduces the computer resources and the database persistent resources required for updating the written contract. When initiating the selective amendment, the action is more light weight resource-wise than full amendments as only the specific sites are cloned (and clone is a heavy action). A lot of unneeded data, as otherwise required for a full amendment process, may not be utilized during the selective amendment process, although all of the amendment data for the full agreement may be kept even when only specific item(s) were changed.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
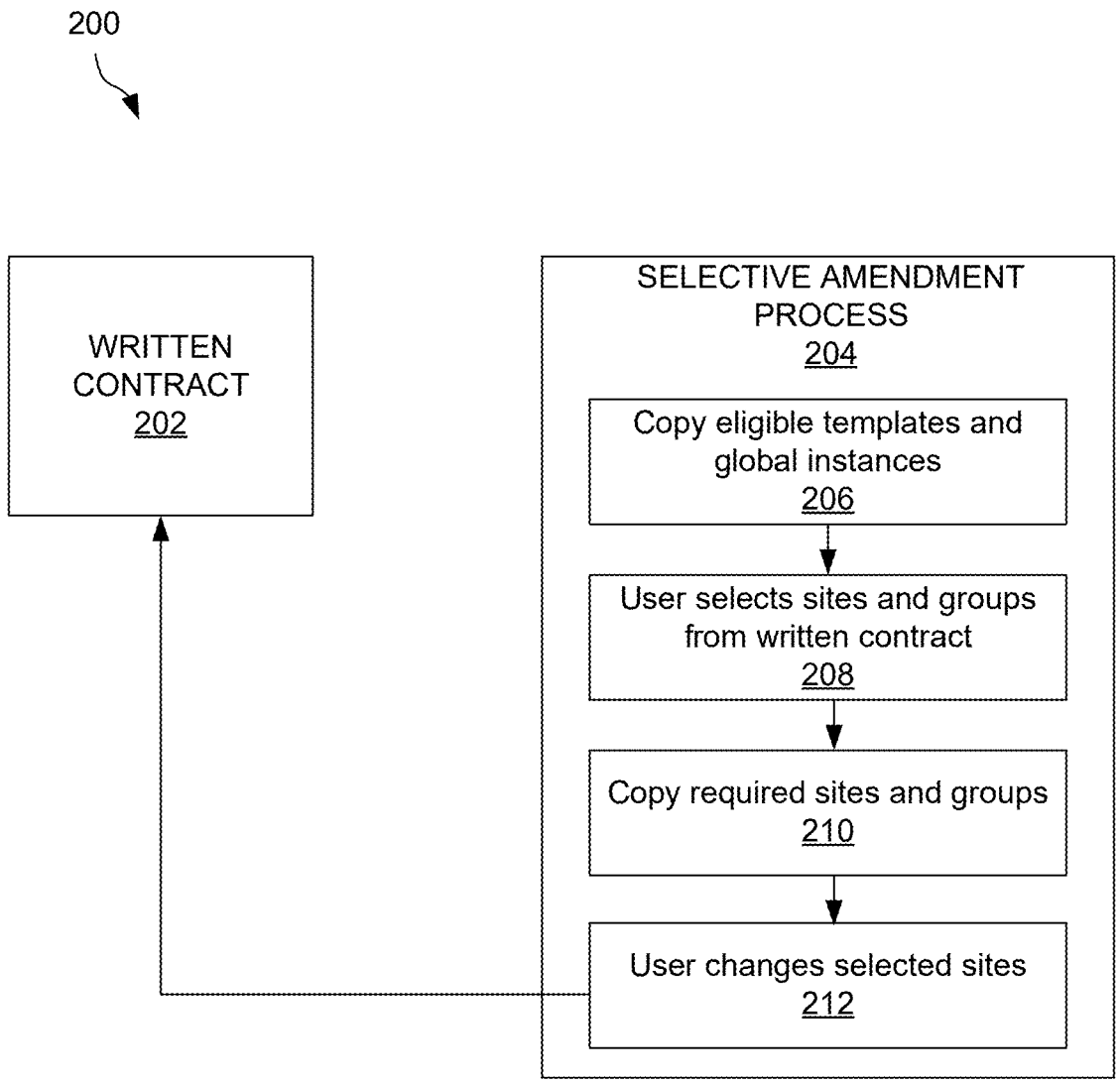
FIG. 2 illustrates a method for selectively amending a large customer agreement, in accordance with one embodiment.

FIG. 2 illustrates a method 200 for selectively amending a large customer agreement, in accordance with one embodiment. As an option, the method 200 may be carried out in the context of the details of the previous figure and/or any subsequent figure(s). Of course, however, the method 200 may be carried out in the context of any desired environment. Further, the aforementioned definitions may equally apply to the description below.

As shown, a written contract 202 exists which represents an agreement to provision a plurality of telecommunication services at a plurality of sites of a customer. The first time a proposal is signed it became a base agreement with the relevant sites, offers, configurations and prices. The written contract 202 is stored in memory of a computer system, and in the present embodiment is accessed for the purpose of performing a selective amendment process 204 on the written contract 202. The selective amendment process 204 may be an application of a platform (e.g. of the computer system) that is used for management of written contracts between a telecommunication service provider and its customers.

The selective amendment process 204 includes copying eligible templates and global instances (operation 206). This operation 206 may be performed as part of a selective amendment initiation process, for example as described in more detail below.

A selective amendment proposal can contain only eligible items, including:

Eligible Templates—A Template is defined in the catalog as eligible to be handled on selective amendment;

Eligible Offers—An offer instance is defined as eligible on a selective amendment if its related template is defined as eligible to be handled on selective amendment;

Eligible Sites—A site is defined as eligible on a selective amendment if all its offers instances are defined as eligible on a selective amendment; and Eligible Groups—A Group is defined as eligible on a selective amendment if all its associated templates are defined as eligible on a selective amendment.

Table 1 illustrates exemplary offers and their associated eligibility definitions.

TABLE 1

| OFFERS Names | Selective amendment indication Property Value |
| --- | --- |
| CPE | True |
| EVC | True |
| Ethernet Dedicated Internet | True |
| Ethernet Network Service | True |
| General Term Information | True |
| Talk 1000 + Unlimited Test + 5 GB − Bundle | True |
| Talk 550 | True |
| Talk and Text 500 | True |
| Talk 800 + Unlimited Text + 2 GB | False |
| Shared Mobile Data | False |

Of course, in other embodiments it may not be necessary to define which items are eligible for selective amendment. For example, a solution may be provided to a customer where all of the items are eligible by default, or a solution may be provided where only part of the items are eligible (per definition).

The selective amendment process 204 also includes a user selecting sites and groups from the written contract (operation 208). These sites and groups may be selected from the eligible items mentioned above. For example, the eligible items may be presented as selectable elements in a user interface. This operation 208 may be performed as part of a site and group selection process, for example as described in more detail below.

The selective amendment process 204 further includes copying required sites and groups (operation 210). The required sites and groups may be determined based on the user selected sites and groups. The selected site(s) may be copied from the written contract to the selective amendment with the actual services, service configurations and negotiated prices. This operation 210 may be performed as part of a site and group cloning process, for example as described in more detail below.

Still yet, the selective amendment process 204 includes a user changing the selected sites (operation 212). Various user interfaces may be provided depending on the type of change requested to be made by the user. For example, the change may include adding a new standalone site, associating a new template to a site, adding, removing, or changing an offer instance, adding a site to a new or existing group, removing a site from a group, associating a template to a new group, cancelling removal of an instance, etc. This operation 212 may be performed as part of an update process corresponding to the type of change being made, for example as described in more detail below.

When the selective amendment proposal is signed, all the changes (sites/services/services configuration, prices) are merged to the written contract. In case there will be a subsequent selective amendment, it will be done on the last updated sites/services/service configuration, prices.

Selective Amendment Initiation Process

A configure parameter is defined to check if a selective amendment is allowed to be used. The configure parameter includes a condition that the selective amendment is allowed when the number of offers instances in the current written contract is more than a predefined minimum threshold. Thus, the condition may indicate that a full amendment (as opposed to a selective amendment) is required when the number of offers instances in the current written contract is less than a predefined minimum threshold. Web logic server (WLS) templates and templates that have no related instances may not be considered in this counting, in one embodiment.

Figure 3B:
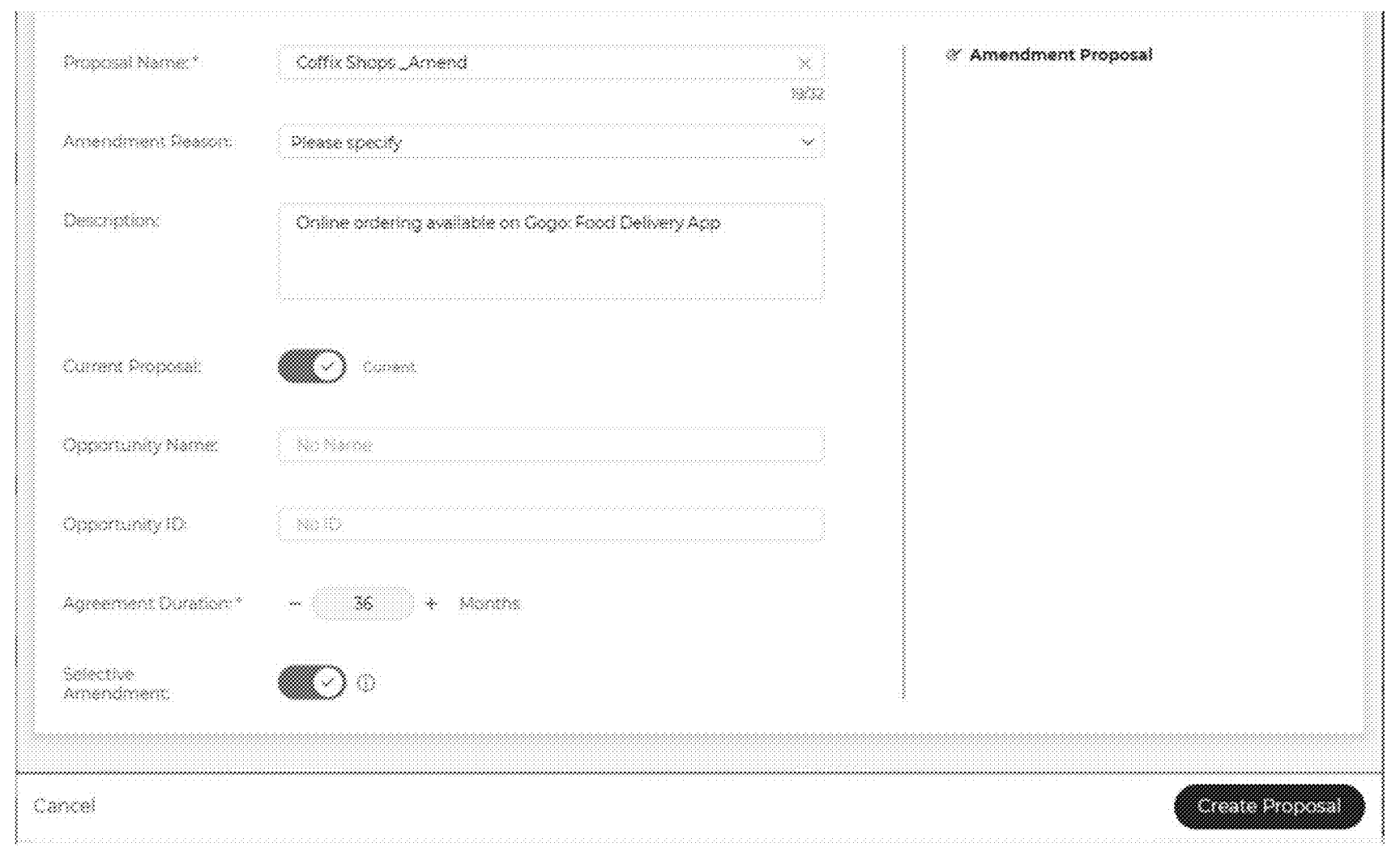
Figure 3C:
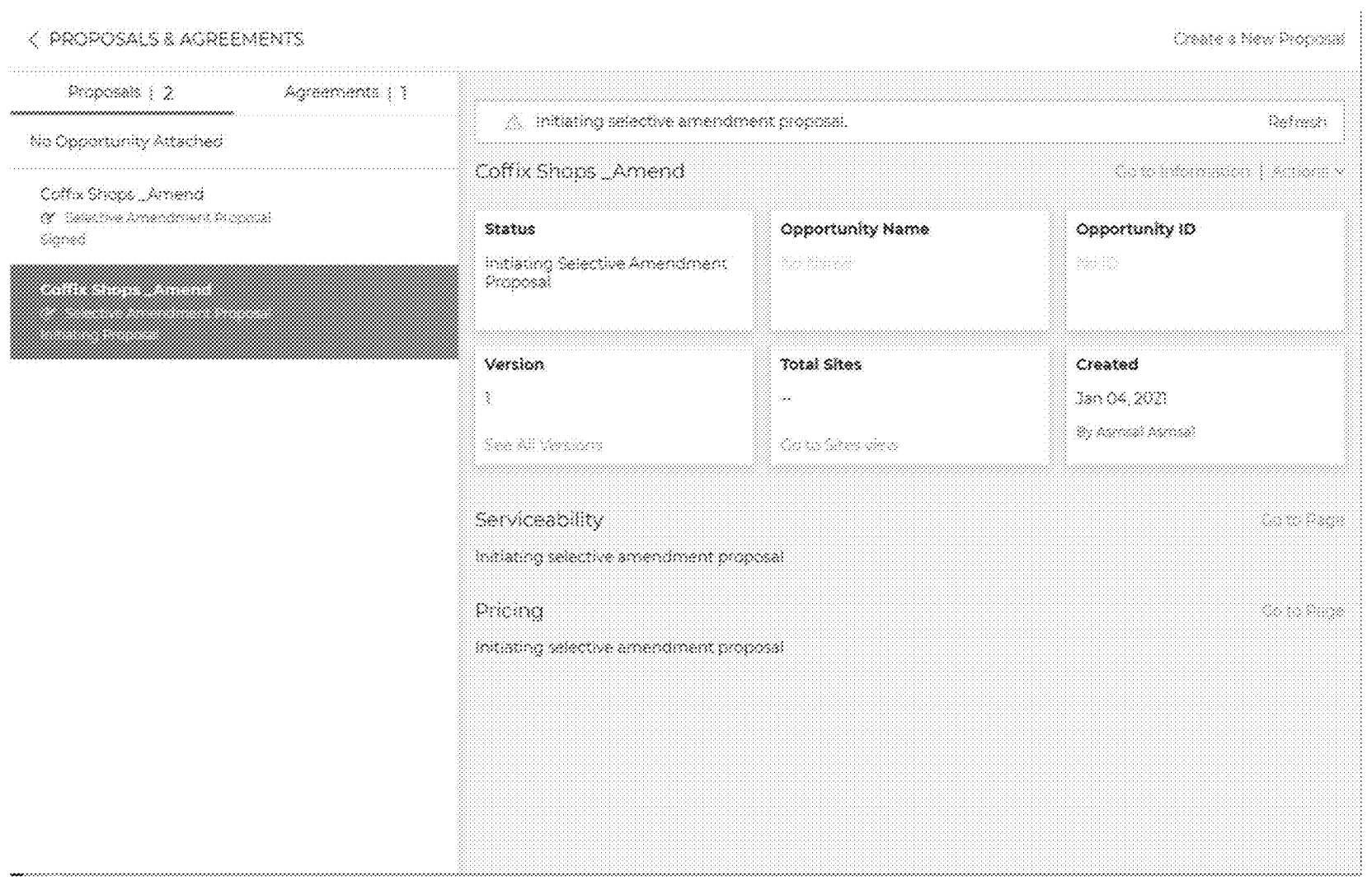

As shown in FIG. 3A, when a selective amendment is allowed to be used for the written contract, the user can choose if to initiate a full amendment or a selective amendment. As shown in FIG. 3B, when a selective amendment is chosen by the user, the selection can be edited again on the initiation user interface, before the amendment proposal is created. During the selective amendment initiation, a relevant indication is displayed indicating that the amendment is being made as a selective amendment. This indication can be displayed in two places of the initiation user interface, namely at the proposal tracking pane, as shown in FIG. 3C, and/or at the top header of each user interface used for making the selective amendment (e.g. at the Offers View, Sites View, Serviceability screen, Pricing screen).

The selective amendment initiation process copies the following:

1) The templates that are defined as eligible for selective amendment, and
2) Global Templates and their global offers instances.

Figure 4:
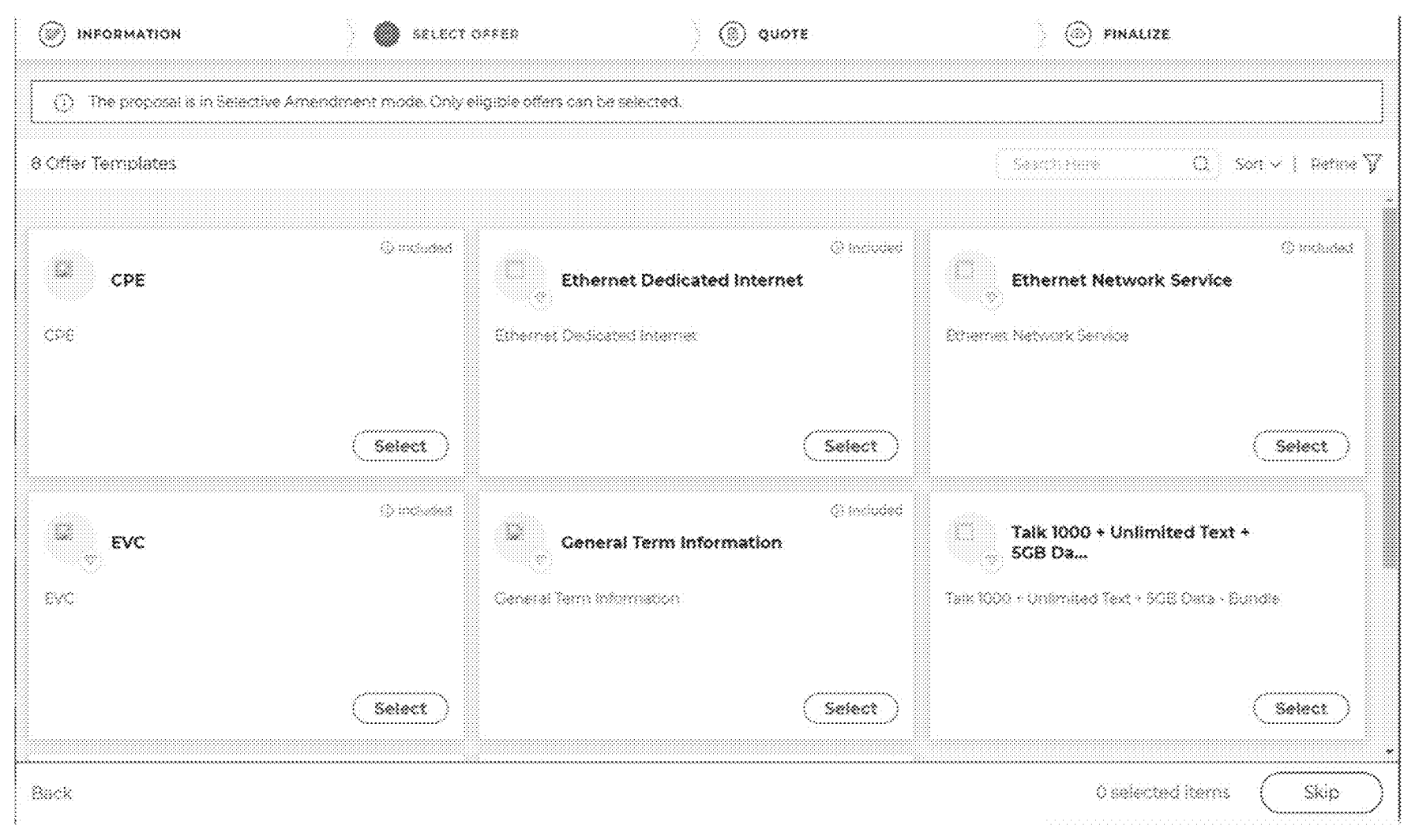

For example, as shown in FIG. 4, on the Select Offer user interface used for browsing eligible offers in association with creating a selective amendment, only eligible offers (as defined on the catalog) will be retrieved and displayed for user selection.

Site and Group Selection Process

Figure 5:
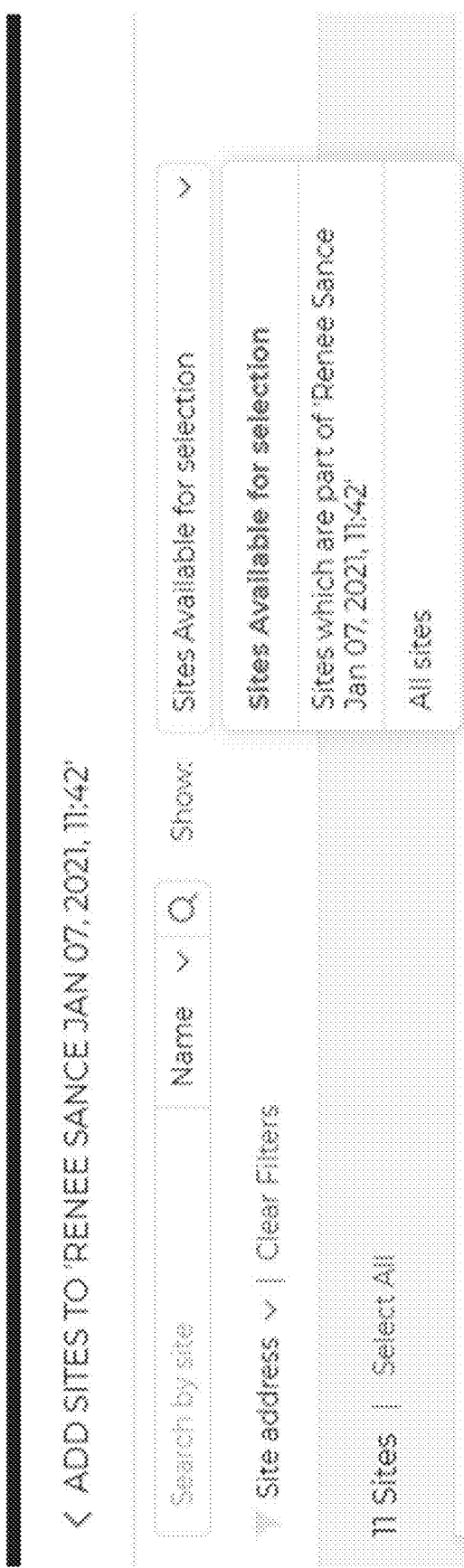
FIG. 5 illustrates a user interface for making a selective amendment that includes adding a new site and associating a template to the new site, in accordance with one embodiment.

The user selects sites and groups from the written contract (operation 208). These sites and groups are selected from the eligible items which are presented as selectable elements. For example, as shown in FIG. 5, sites available for selection are listed when the user requests to make a selective amendment that includes adding a new site and associating a template to the new site.

Figure 6:
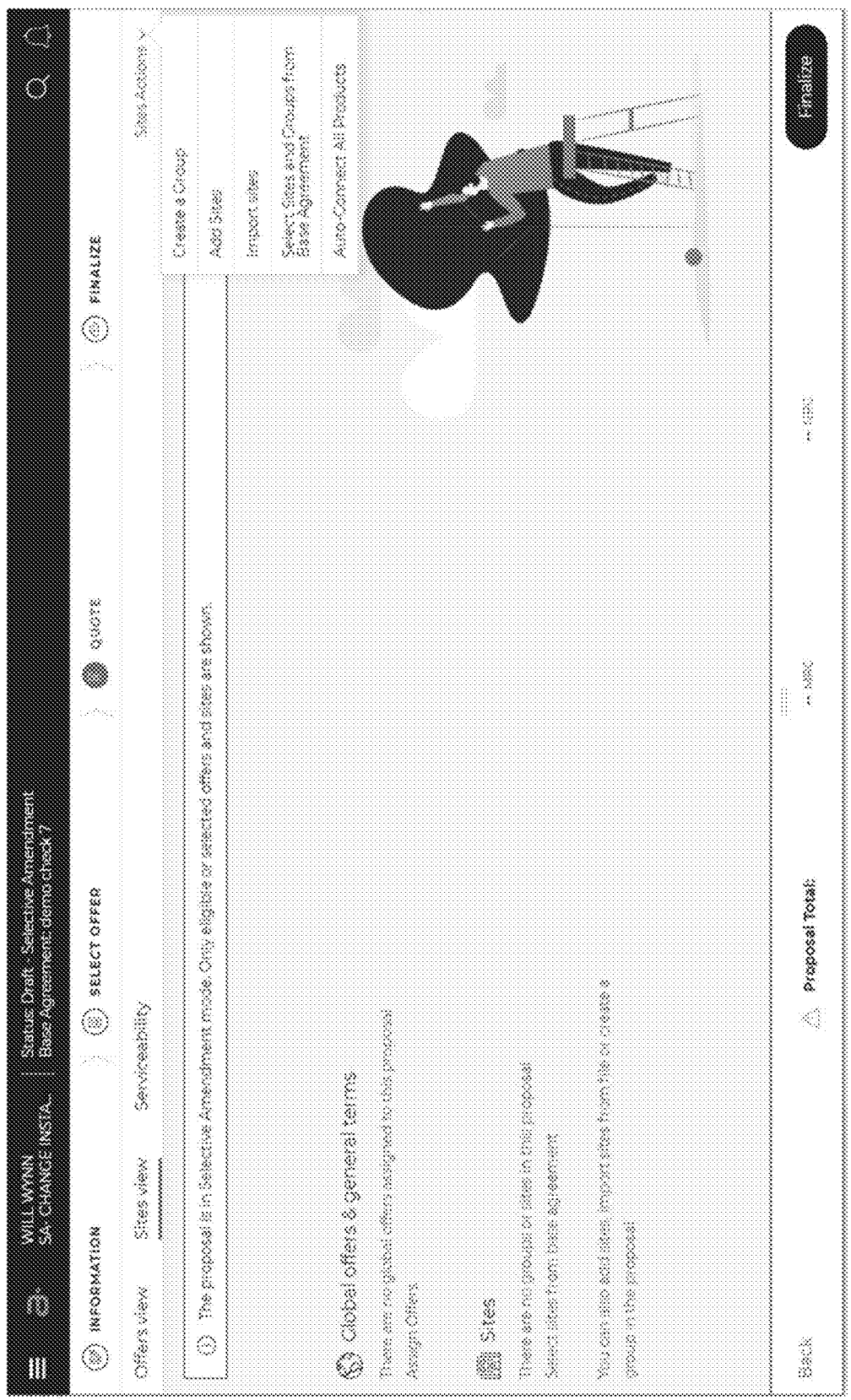
FIG. 6 illustrates a user interface for cloning a site for use in making a selective amendment, in accordance with one embodiment.

The Select Sites (and Groups) from Base Agreement user interface, which is used for cloning a site for use in making a selective amendment, can be opened from the menu Action at the Sites View and/or the link at the Sites area, as shown in FIG. 6.

Figure 7A:
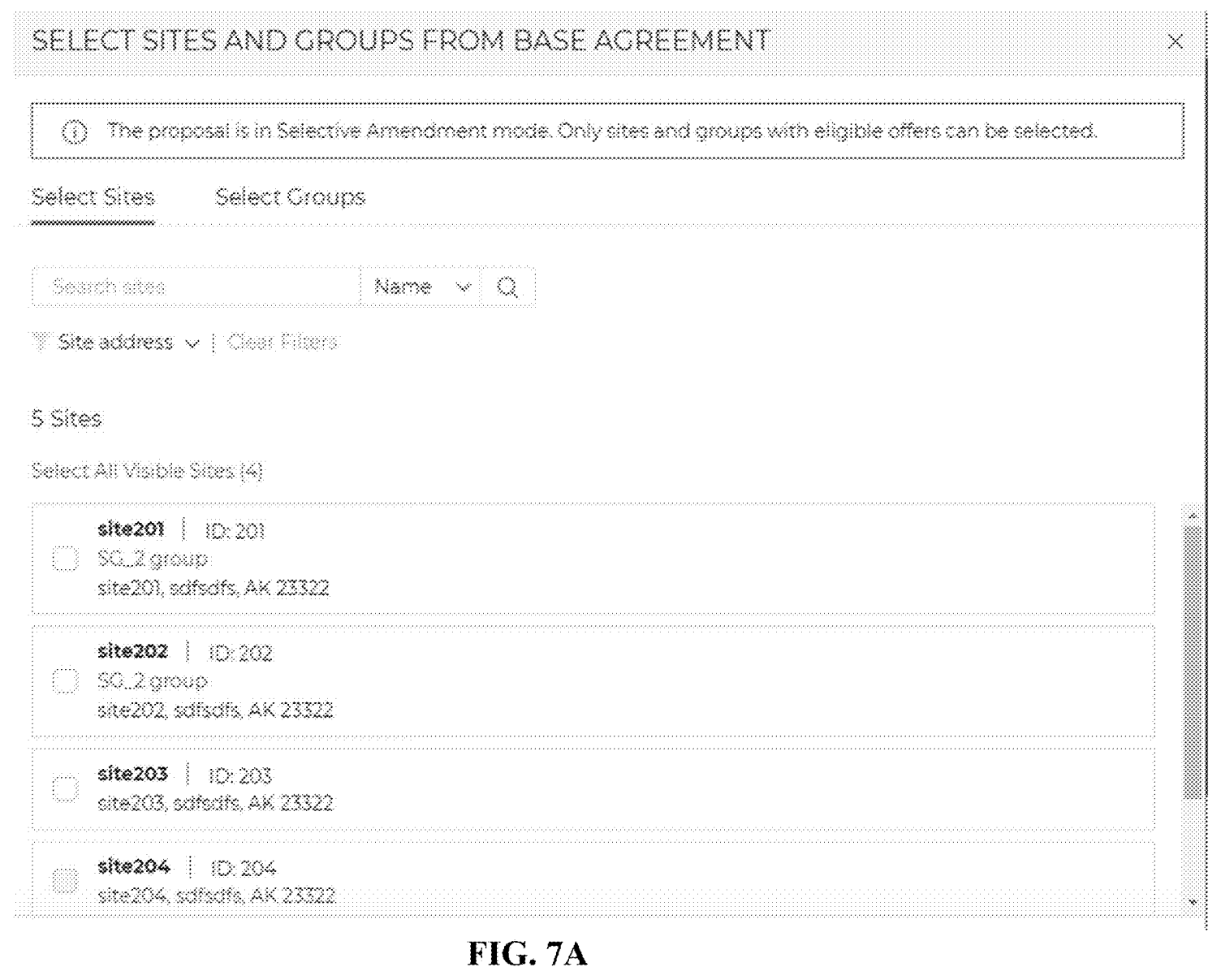
Figure 7B:
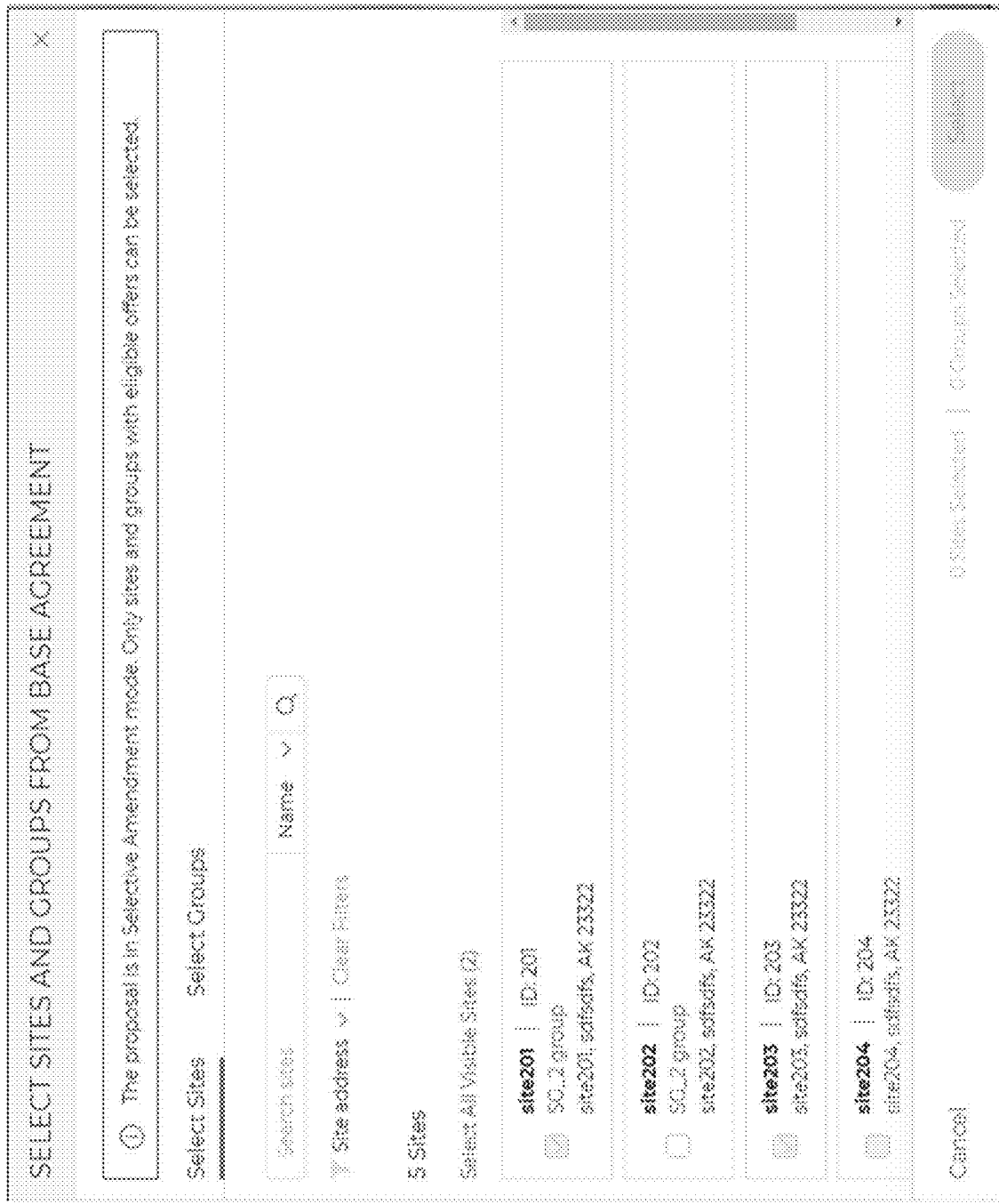

FIGS. 7A-D illustrate user interfaces for selecting sites and groups from a written contract for making a selective amendment, in accordance with one embodiment. As shown in FIG. 7A, the user interface displays a list of all the sites from the base agreement (i.e. the latest version of the written contract): The eligible sites are available for selection; The none eligible sites will not be able to be selected. As also shown, the sites can be standalone or sites under a Group.

As shown in FIG. 7B, the user interface displays all the sites from the base agreement: The sites that were already copied to the current amendment are marked as checked and disabled; The eligible sites on base agreement are marked as unchecked and enabled; The "none eligible for selective amendment" will be displayed as unchecked and disabled.

Figure 7C:
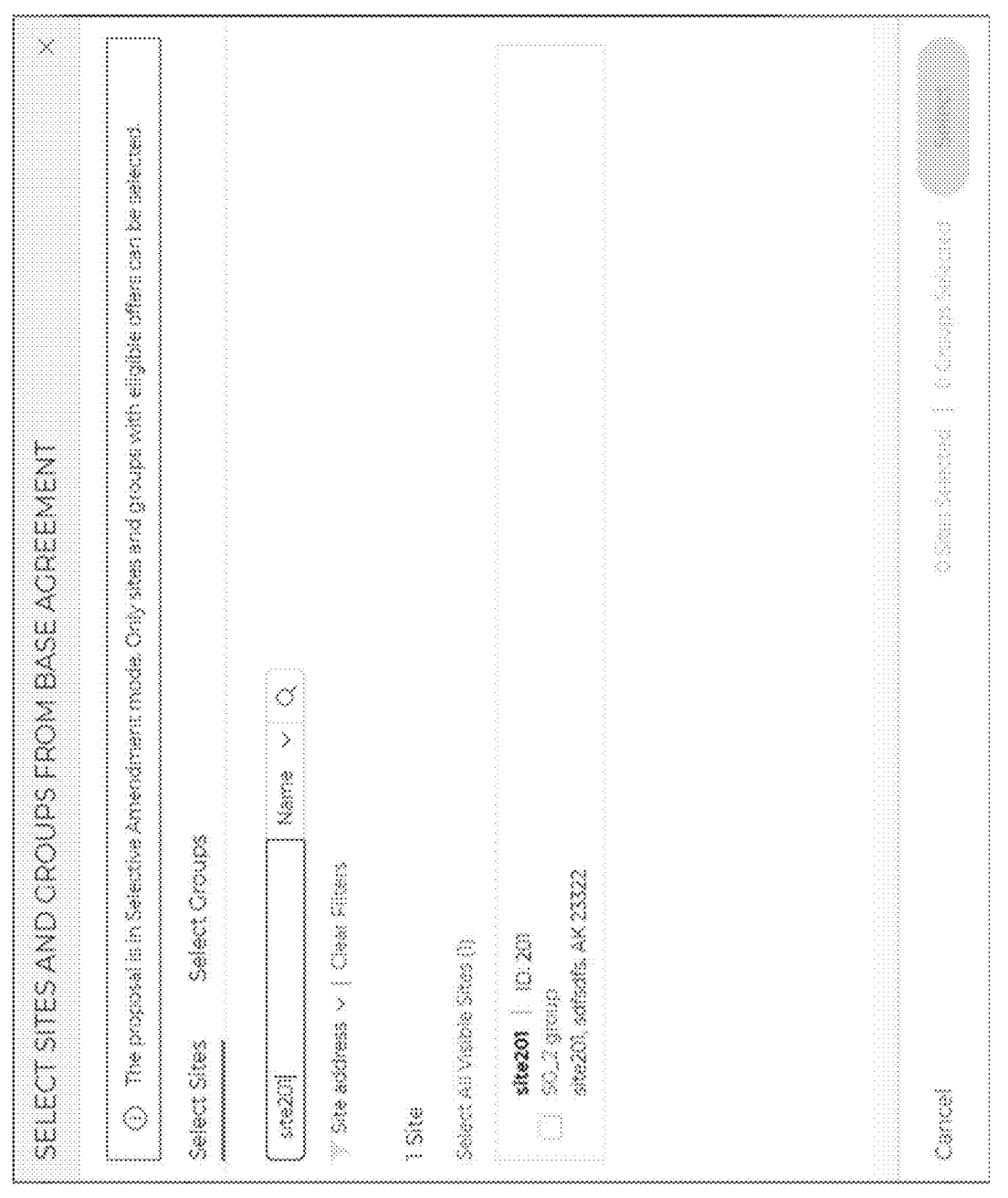

As shown in FIG. 7C, a search option may be provided in a user interface for allowing the user to search for sites. The search option may allow the user to search by: site identifier (ID), site name, site address. The user interface displays search results including: total number of search site results, and the ability to select/deselect individual sites listed or multiple sites. A select button at the bottom of the user interface becomes enabled only when at least one site is selected.

Figure 7D:
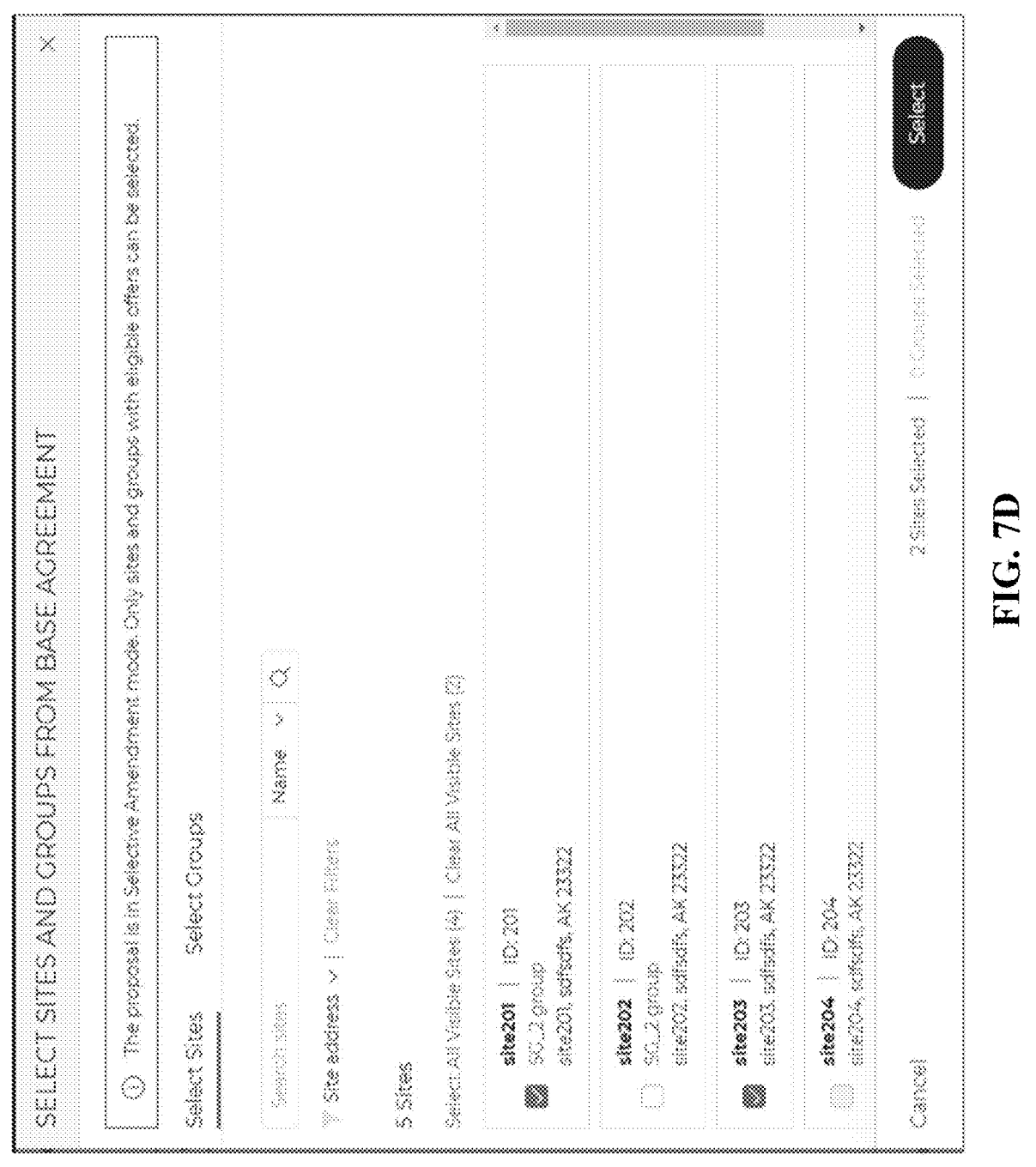

As shown in FIG. 7D, when site search results are displayed, there may be an ability to Select All visible sites (indicated with the number of available sites) per displayed page. As also shown, there may be an ability to clear selection of all the selected sites in the current page (with the number of selected sites displayed).

Figure 7E:
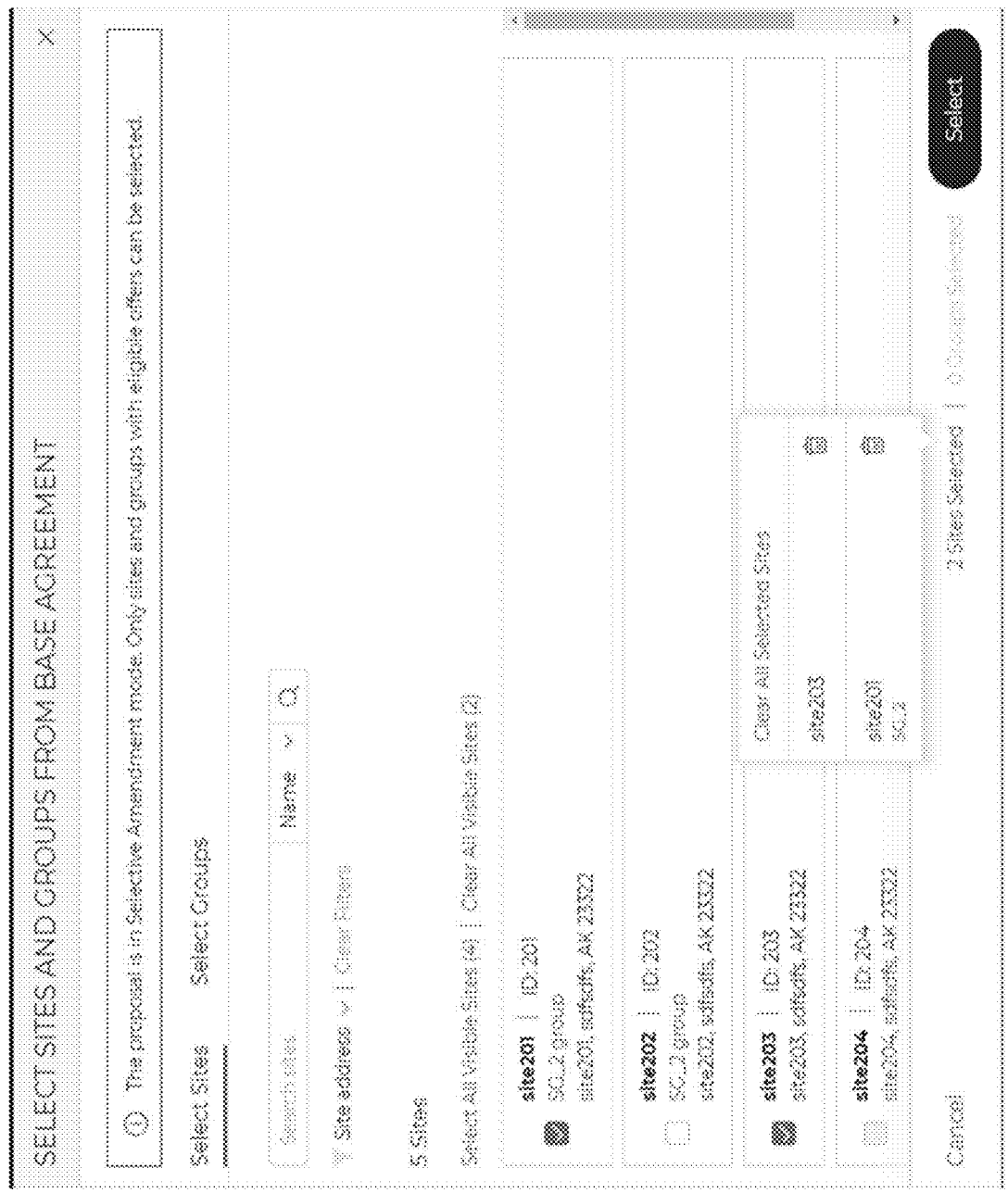

As shown in FIG. 7E, when site search results are displayed, the total number of selected sites can be displayed at the bottom of the screen, all the selected sites can be displayed in a listed popup, each of the sites can be deselected, and there is an ability to deselect all the sites.

Figure 7F:

As shown in FIG. 7F, groups can also be searched. The groups can be searched by group name. The user interface displays search results including: total number of search group results, and the ability to select/deselect individual groups listed or multiple groups. A count of the selected groups may be displayed. A select button at the bottom of the user interface becomes enabled only when at least one site or group is selected.

Site and Group Cloning Process

Once the user selects one or more sites (and selects the "Select" button on the bottom of the user interface), the site and group cloning process is activated where the selected sites and their groups are cloned to the selective amendment. This process provides the ability to clone the requested sites and the groups, including their nested items. The cloning may include to: Clone Groups, Clone Sites (standalone sites, Sites under Site Group), Clone Offers, Clone Products, Clone Dependencies.

In one embodiment, selected sites and groups will be cloned to the requested proposal (selective amendment) version and will be copied also to the first proposal version. All the cloned items may be copied to the first selective amendment proposal version so that in case a proposal version is deleted, the cloned sites and groups will be still be displayed at the selective amendment without changes that were done on the proposal version.

In another embodiment, a group may be defined as eligible on the selective amendment if all its associated templates are defined as eligible on the selective amendment. The group validation may be done previous to the clone request. As another option, the groups, which may be requested to be cloned as part of sites under a group, may be validated on the site and group cloning process.

When cloning a group, the group may be cloned only with its associated templates. When a group is requested to be copied as part of a site under a group, the group may be cloned with its associated templates and the requested site under it. The group will be displayed only with its associated sites that were cloned to the selective amendment. The group may be cloned only once, particularly in the case that it was already requested or in the case that the same group is requested to be cloned also as another site under the group. The group prices may be updated according to the cloned sites at the selective amendment.

In a further embodiment, a site may be defined as eligible on the selective amendment if all its offer instances are defined as eligible on the selective amendment. In one embodiment, the site validation is expected to be done previous to the clone request. In another embodiment, when sites under groups are requested to be cloned, the groups may be validated on the site and group cloning process before they will be created.

In one embodiment, the site is cloned with all its associated offers, products and the dependencies between the products. In another embodiment, the sites will be able to be cloned only once. In yet another embodiment, the sites and their offers and products will be cloned in chunks. The sites prices may be updated from the offers, as they are copied from the base agreement. The number of the templates associated with the sites at the Offers View may be updated according to the cloned/New sites at the selective amendment.

The offers and products may be cloned as part of each required site. The offers and product instances may be cloned as a last updated configuration at the base agreement. Last updated prices of the offers and products may be included, if they were overridden.

As part of the site and group cloning process, the dependencies between the copied products may be cloned. In one embodiment, all the dependencies that are related to the source products will be copied if their target products exist at the current selective amendment. In another embodiment, the dependencies are cloned only in case both sites of the products already exist at the selective amendment proposal. The dependencies may be cloned after all the requested sites with their offers and products are cloned. The Dependencies can be defined: Internally in the offer or the site; Between Cross sites; Between sites' products and global offers.

Update Process

The cloned sites, on the selective amendment, can be changed by: Add and Remove Offers, Add and Remove optional products, Change offer cardinality, Change products configurations, Override prices. The selective amendment will merge the changed instances to the base agreement, for example, upon approval. In case the sites are part of groups, the group associations will be recalculated based on the base agreement (instead copying the group data from the selective amendment as otherwise implemented at the regular amendment proposal during a full amendment process).

Update Embodiment 1—Clone and Change Site Instances on Selective Amendment

On selective amendment, when the offers of a site are required to be changed, the user first needs to select the relevant site and clone it to the selective amendment proposal. On selective amendment, allow the user to clone sites via the user interfaces that use the Clone Sites backend abilities. On selective amendment, allow the user to change sites' instances on selective amendment, including: Add and Remove Offers, Add and Remove optional products, Change offer cardinality, Change product configurations, Override prices, and Clone and Change sites (can be standalone sites or sites under groups).

Update Embodiment 2—Remove Site from Group and Standalone

When a site is required to be removed it should be first cloned to the selective amendment. On selective amendment, the cloned site can be removed. The Remove actions that are available include: Remove standalone site, Remove Site from group, Remove Site under group from proposal.

Update Embodiment 3—Add Site to Group

There is an ability to clone a group from the base agreement to the existing selective amendment. Only Eligible groups may be available for selection and can be cloned. The group may be cloned with its associated templates. In one embodiment, an eligible group is a group that all its associated templates are defined as eligible on selective amendment. In another embodiment, The sites related to the cloned group may not be cloned with the group—in this case the user needs to explicitly request to clone the sites under a group from the Select Sites user interface.

In order to add new/existing sites to a group, the user needs first to select and clone the group to the selective amendment. A new site that is added to the selective amendment will be available and can be added to the group. An existing site should be first cloned to the selective amendment proposal and only then it will be available to be added to the group.

Update Embodiment 4—Assign Template to New Group

Create New group is allowed on the selective amendment and all the actions related to group are available on the new group and include: Associate new template, Disassociate new template, Remove group, Add/Remove new/existing cloned sites.

For an existing cloned group, only actions that do not impact all the sites are allowed on selective amendment. The available actions on groups include: Add and remove sites to/from the group, Auto Connect group products.

The following actions may not be allowed on existing cloned groups on the selective amendment: Remove group action on existing group, Rename existing group name, Associate new or existing template to Existing Group, Disassociate new or existing template from existing Group, Change existing templates that is associated to an existing group (include product Configuration changes like: Add/remove/Change).

Figure 8:
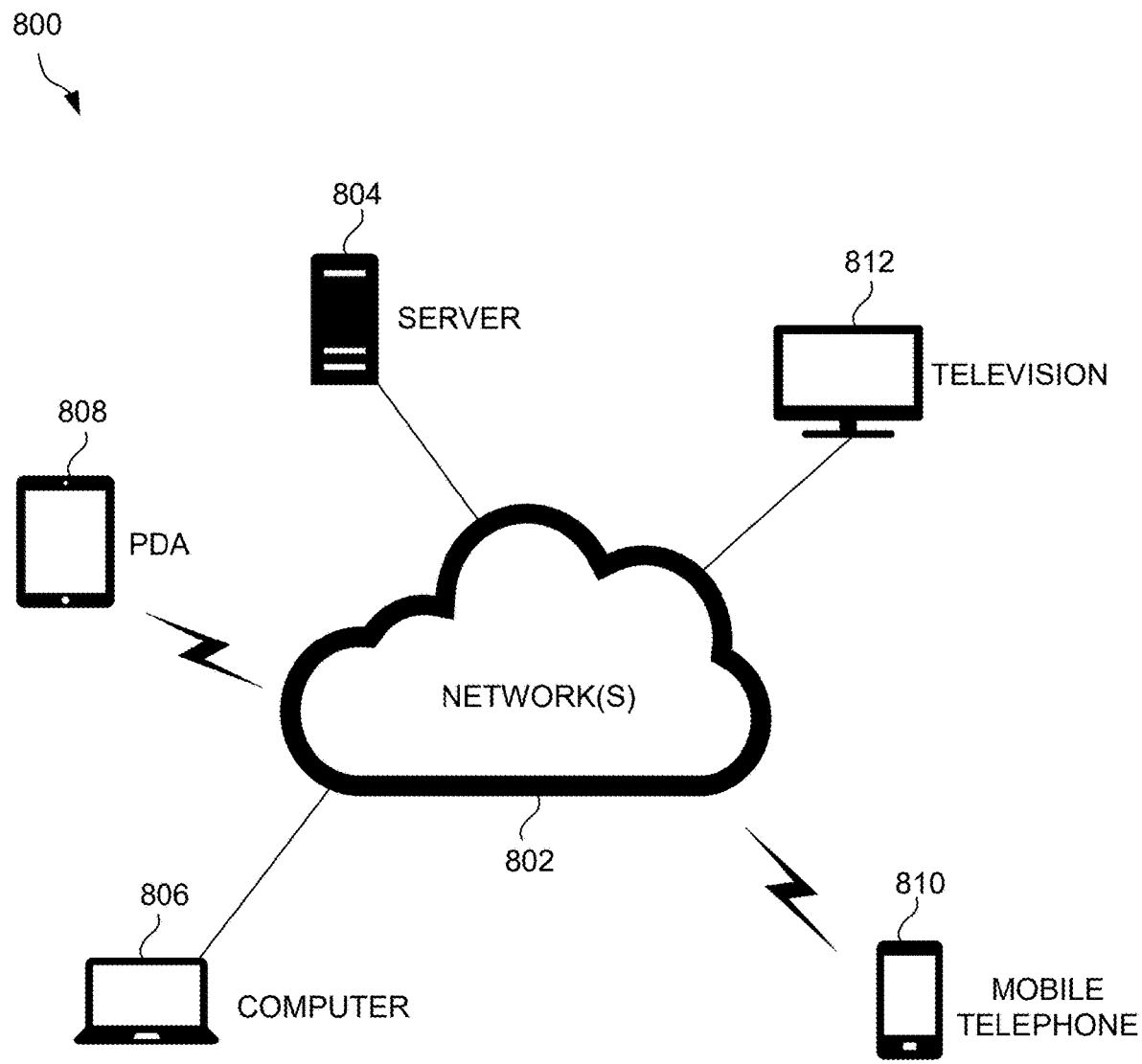
FIG. 8 illustrates a network architecture, in accordance with one possible embodiment.

FIG. 8 illustrates a network architecture 800, in accordance with one possible embodiment. As shown, at least one network 802 is provided. In the context of the present network architecture 800, the network 802 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 802 may be provided.

Coupled to the network 802 is a plurality of devices. For example, a server computer 804 and an end user computer 806 may be coupled to the network 802 for communication purposes. Such end user computer 806 may include a desktop computer, lap-top computer, and/or any other type of logic. Still yet, various other devices may be coupled to the network 802 including a personal digital assistant (PDA) device 808, a mobile phone device 810, a television 812, etc.

Figure 9:
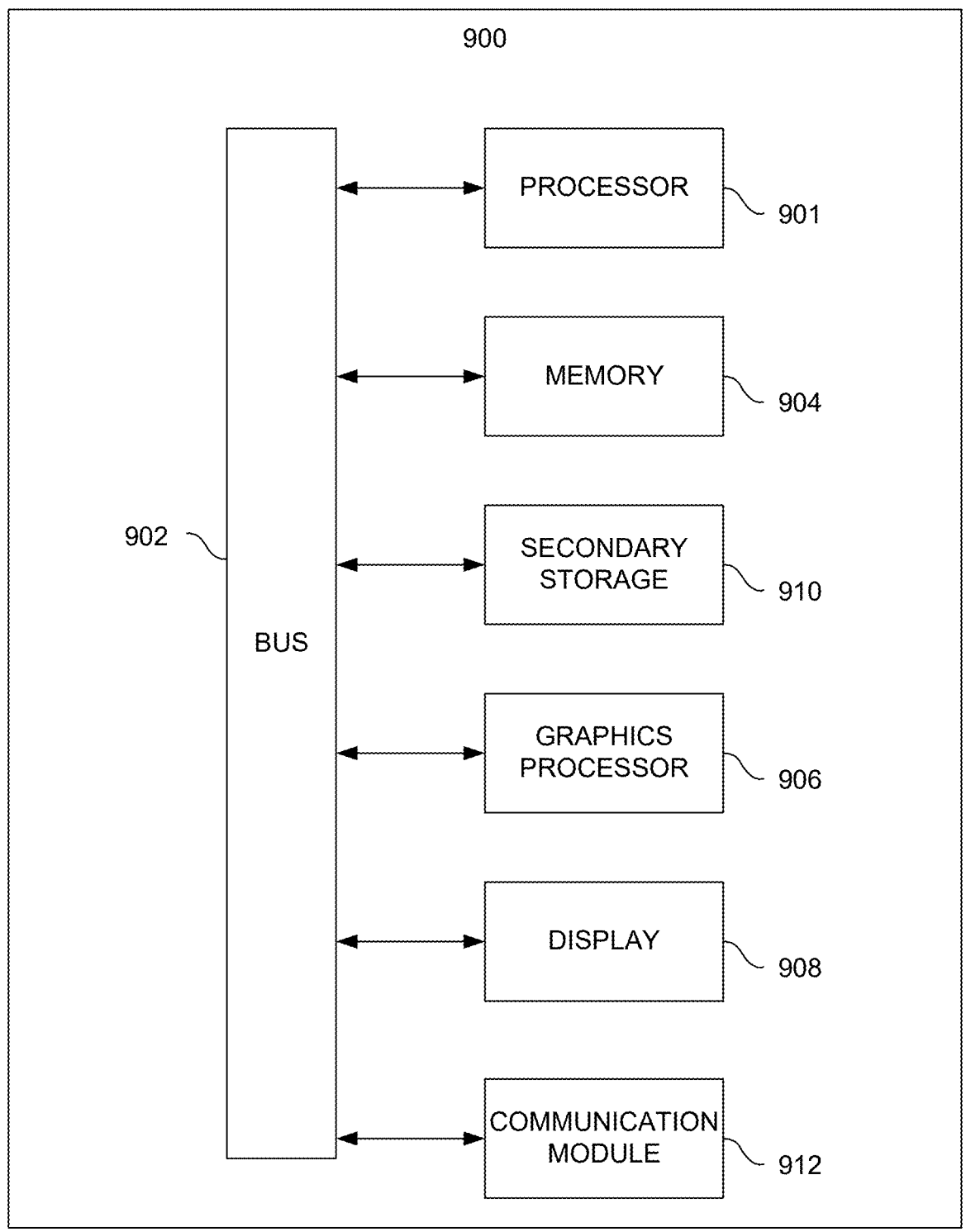
FIG. 9 illustrates an exemplary system, in accordance with one embodiment.

FIG. 9 illustrates an exemplary system 900, in accordance with one embodiment. As an option, the system 900 may be implemented in the context of any of the devices of the network architecture 800 of FIG. 8. Of course, the system 900 may be implemented in any desired environment.

As shown, a system 900 is provided including at least one central processor 901 which is connected to a communication bus 902. The system 900 also includes main memory 904 [e.g. random access memory (RAM), etc.]. The system 900 also includes a graphics processor 906 and a display 908.

The system 900 may also include a secondary storage 910. The secondary storage 910 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 904, the secondary storage 910, and/or any other memory, for that matter. Such computer programs, when executed, enable the system 900 to perform various functions (as set forth above, for example). Memory 904, storage 910 and/or any other storage are possible examples of non-transitory computer-readable media.

The system 900 may also include one or more communication modules 912. The communication module 912 may be operable to facilitate communication between the system 900 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
    create an electronic document upon acceptance by a customer of at least one offer to provision a plurality of telecommunication services at a plurality of sites of the customer, wherein the electronic document stores a written contract representing an agreement to provision the plurality of telecommunication services at the plurality of sites of the customer in accordance with the at least one offer;
    access the electronic document to determine a plurality of items in the written contract, wherein the plurality of items include at least the at least one offer and the plurality of sites of the customer;
    determine that a parameter defined for the written contract indicates that the written contract is allowed to be updated via a selective amendment;
    responsive to determining that the parameter defined for the written contract indicates that the written contract is allowed to be updated via the selective amendment, determine a subset of the plurality of items in the written contract that are eligible for updating;
    provide a user interface presenting, as a plurality of selectable elements, the subset of the plurality of items in the written contract that are eligible for updating;
    receive, via the user interface, a selection of one of the plurality of selectable elements;
    clone one of items in the written contract that corresponds to the selection to form a cloned item;
    receive, via the user interface, a change to the cloned item which represents an update to only a portion of the written contract;
    merge the update with the written contract to form an amended written contract;
    wherein a subsequent selective amendment is made to the amended written contract.

2. The non-transitory computer-readable media of claim 1, wherein the written contract is created by applying offer-specific rates to a customer proposal, and wherein the selective amendment is created by applying the offer-specific rates to the update.

3. The non-transitory computer-readable media of claim 1, wherein the parameter defined for the written contract indicates that the written contract is allowed to be updated when the written contract includes a required minimum number of offer instances.

4. The non-transitory computer-readable media of claim 1, wherein the update includes adding a new standalone site.

5. The non-transitory computer-readable media of claim 1, wherein the update includes associating a new template to a site.

6. The non-transitory computer-readable media of claim 1, wherein the update includes adding, removing, or changing an offer instance.

7. The non-transitory computer-readable media of claim 1, wherein the update includes adding a site to a new or existing group.

8. The non-transitory computer-readable media of claim 1, wherein the update includes removing a site from a group.

9. The non-transitory computer-readable media of claim 1, wherein the update includes associating a template to a new group.

10. The non-transitory computer-readable media of claim 1, wherein the update includes cancelling removal of an instance.

11. The non-transitory computer-readable media of claim 1, wherein the update includes one of a plurality of predefined types of updates to be performed on one or more of a plurality of eligible items.

12. A method, comprising:
    at a computer system:
    creating an electronic document upon acceptance by a customer of at least one offer to provision a plurality of telecommunication services at a plurality of sites of the customer, wherein the electronic document stores a written contract representing an agreement to provision the plurality of telecommunication services at the plurality of sites of the customer in accordance with the at least one offer;
    accessing the electronic document to determine a plurality of items in the written contract, wherein the plurality of items include at least the at least one offer and the plurality of sites of the customer;
    determining that a parameter defined for the written contract indicates that the written contract is allowed to be updated via a selective amendment;
    responsive to determining that the parameter defined for the written contract indicates that the written contract is allowed to be updated via the selective amendment, determining a subset of the plurality of items in the written contract that are eligible for updating;
    providing a user interface presenting, as a plurality of selectable elements, the subset of the plurality of items in the written contract that are eligible for updating;
    receiving, via the user interface, a selection of one of the plurality of selectable elements;

cloning one of items in the written contract that corresponds to the selection to form a cloned item;

receiving, via the user interface, a change to the cloned item which represents an update to only a portion of the written contract;

merging the update with the written contract to form an amended written contract;

wherein a subsequent selective amendment is made to the amended version of the written contract.

13. A system, comprising:

a non-transitory memory storing instructions; and one or more processors in communication with the non-transitory memory that execute the instructions to:

create an electronic document upon acceptance by a customer of at least one offer to provision a plurality of telecommunication services at a plurality of sites of the customer, wherein the electronic document stores a written contract representing an agreement to provision the plurality of telecommunication services at the plurality of sites of the customer in accordance with the at least one offer;

access the electronic document to determine a plurality of items in the written contract, wherein the plurality of items include at least the at least one offer and the plurality of sites of the customer;

determine that a parameter defined for the written contract indicates that the written contract is allowed to be updated via a selective amendment;

responsive to determining that the parameter defined for the written contract indicates that the written contract is allowed to be updated via the selective amendment, determine a subset of the plurality of items in the written contract that are eligible for updating;

provide a user interface presenting, as a plurality of selectable elements, the subset of the plurality of items in the written contract that are eligible for updating;

receive, via the user interface, a selection of one of the plurality of selectable elements;

clone one of items in the written contract that corresponds to the selection to form a cloned item;

receive, via the user interface, a change to the cloned item which represents an update to only a portion of the written contract;

merge the update with the written contract to form an amended written contract;

wherein a subsequent selective amendment is made to the amended version of the written contract.

* * * * *